United States Patent [19]

Rao et al.

[11] Patent Number: 5,591,793
[45] Date of Patent: Jan. 7, 1997

[54] THIXOTROPIC ALKYD RESINS AND THE USE THEREOF IN COATING COMPOSITIONS

[75] Inventors: Madhukar Rao, Brecksville; Hyeong-Chan Youn; Anthony F. Toussaint, both of Cleveland; Marianne G. DeCapite, Broadview Heights, all of Ohio

[73] Assignee: The Sherwin-Williams Company, Cleveland, Ohio

[21] Appl. No.: 574,465

[22] Filed: Dec. 14, 1995

Related U.S. Application Data

[63] Continuation of Ser. No. 228,543, Apr. 15, 1994, abandoned.

[51] Int. Cl.$^6$ ............................................ C08L 77/00
[52] U.S. Cl. ........................ 524/310; 524/445; 524/447; 524/492; 524/493; 524/538; 525/420.5; 525/437
[58] Field of Search ........................ 524/310, 492, 524/493, 445, 447, 538; 525/420.5, 437

[56] References Cited

U.S. PATENT DOCUMENTS

| | | | |
|---|---|---|---|
| 2,663,649 | 12/1953 | Winkler | 106/287 |
| 3,131,201 | 4/1964 | Hovey | 260/404.5 |
| 3,254,040 | 5/1966 | Aronoff et al. | 525/420.5 |
| 4,026,850 | 5/1977 | Frank et al. | 525/420.5 |
| 4,128,436 | 12/1978 | O'Hara et al. | 106/243 |
| 4,462,926 | 7/1984 | Prater et al. | 252/315.1 |
| 4,778,843 | 10/1988 | Cooperman et al. | 524/606 |
| 4,840,980 | 6/1989 | Pekarik | 523/456 |
| 5,034,444 | 7/1991 | Yun et al. | 524/223 |
| 5,180,802 | 1/1993 | Hartman et al. | 528/335 |

FOREIGN PATENT DOCUMENTS

| | | | |
|---|---|---|---|
| 707824 | 4/1965 | Canada | 525/420.5 |
| 0528363 | 2/1993 | European Pat. Off. | C08G 69/28 |
| 2113230 | 8/1983 | United Kingdom | 525/420.5 |

OTHER PUBLICATIONS

Thixatrol ® TSR, DS–544, Aug. 1991, Rheox, Inc.
Designing Rheological Additives For Coatings Systems, American Paint & Coatings Journal, Jan. 4 1993, pp. 38–47.
H. N. Nae and W. W. Reichert, Rheological Properties And Thickening Mechanisms of Polymeric Rheology Modifiers, NL Chemicals, pp. 624–628.
H. R. Crawford, Flexibility—The Key To Wood Protection, Surface Coatings Australia, Nov. 1987, pp. 17–18.
K. O'Hara and W. P. Gordon, Thixotropy In Industrial Coatings, XIth International Conference In Organic Coatings Science And Technology, Proceedings 11, 8–12 Jul. 1985, Athens, Greece, pp. 273–292.
A. Kastanek and K. Hajek, A Study Of Thixotropic Flow Behavior of Alkyd Solutions, Journal Of Coatings Technology, vol. 63, No. 800, Sep. 1991, pp. 75–82.
W. E. Shackelford and D. W. Glaser, Thixotropic Modification Of Alkyd Resin Paints With Polyamides, Journal of Paint Technology, vol. 38, No. 496, May 1966, pp. 293–301.
L. Newton, Heat and Polar Solvent Tolerant Thixotropic Resins, Paint & Resin — Sep./Oct. 1982, pp. 14, 15 & 38.

Primary Examiner—Ana Woodward
Attorney, Agent, or Firm—Heidi A. Boehlefeld; Robert E. McDonald; Steven W. Tan

[57] ABSTRACT

Novel thixotropic alkyd resins are obtained by reacting at a temperature of between about 120° C. to about 150° C. for at least one hour (a) at least one alkyd resin and (b) a polyamide comprising the reaction product of: (i) a polycarboxylic acid; (ii) an active hydrogen compound having the formula $X_m$—R—$Y_n$, wherein R represents a group containing from 2 to 12 carbon atoms, X and Y are independently selected from primary amino, secondary amino and hydroxy, and m and n are each at least 1 and the sum of (m+n) is at least 2; and (iii) a capping agent comprised of an unsaturated and/or hydroxy functional monocarboxylic acid having from 8 to 22 carbon atom. The thixotropic alkyd resins of the present invention are particularly useful in preparing thixotropic paint and coating compositions having superior leveling and sag resistance.

25 Claims, No Drawings ns/1 THIXOTROPIC ALKYD RESINS AND THE USE THEREOF IN COATING COMPOSITIONS

This application is a continuation of application Ser. No. 08/228,543 filed on Apr. 15, 1994, now abandoned.

FIELD OF THE INVENTION

The present invention relates to thixotropic alkyd compositions, and more particularly, to thixotropic alkyd resins for use in paint and coating compositions. The present invention also relates to the process of manufacturing such thixotropic alkyd resins and paint compositions.

BACKGROUND OF THE INVENTION

Thixotropy in conventional paint and coating compositions is desired because thixotropy helps to reduce pigment separation and settlement. In addition, thixotropy improves the transfer of the paint to the brush or roller and reduces the tendency of the paint to drip and splatter as it is being applied. Thixotropic recovery also enables a thicker film of paint to be applied without sagging.

Thixotropes are generally divided into two categories: additive thixotropes and thixotropic resins. Additive thixotropes include fumed silicas, sulphonated castor oil, organo-modified clays, hydrogenated castor oil based additives and organic wax pastes. These thixotropes are typically added to the paint composition during the pigment dispersion phase of paint manufacture. Thixotropic resins can be prepared by reacting an oil soluble dimer acid based polyamide resin onto an alkyd resin using a carefully controlled amide/ester interchange reaction. Thixotropy develops from the hydrogen bonding between the —NH groups and the adjacent —OH groups. The synthesis of thixotropic alkyd resins is typically carried out at high temperature and between amine and alkyd resins that have been stripped of solvents.

It has been found that thixotropic resins may be prepared at low temperature from solvent borne alkyd resin and solvent borne polyamide resin. Furthermore, thixotropic resins can easily be prepared from more than one alkyd resin since there is no need to strip the organic solvent from the alkyd resin prior to reaction with the polyamide resin. Paints and coatings prepared from these thixotropic resins exhibit superior flow leveling and sag resistance. Conventional thixotropic additives may also be incorporated into the paint and coating compositions to further enhance thixotropy.

SUMMARY OF THE INVENTION

The present invention relates to a process of preparing a thixotropic alkyd resin which comprises heating to a temperature of between about 120° and 150° C. for at least one hour (a) at least one alkyd resin and (b) a polyamide comprising the reaction product of: (i) a polycarboxylic acid; (ii) an active hydrogen compound having the formula $X_m$—R—$Y_n$, wherein R represents a group containing from 2 to 12 carbon atoms, X and Y are independently selected from primary amino, secondary amino and hydroxy, and m and n are each at least 1 and the sum of (m+n) is at least 2; and (iii) a capping agent comprised of an unsaturated and/or hydroxy functional monocarboxylic acid having from 8 to 22 carbon atoms.

The present invention further relates to a thixotropic resin comprising the reaction product of (a) at least one alkyd resin and (b) a polyamide comprising the reaction product of: (i) a polycarboxylic acid; (ii) an active hydrogen compound having the formula $X_m$—R—$Y_n$, wherein R represents a group containing from 2 to 12 carbon atoms, X and Y are independently selected from primary amino, secondary amino and hydroxy, and m and n are each at least 1 and the sum of (m+n) is at least 2; and (iii) a capping agent comprised of an unsaturated and/or hydroxy functional monocarboxylic acid having from 8 to 22 carbon atoms.

DETAILED DESCRIPTION OF THE INVENTION

The thixotropic alkyd resin of the present invention can be prepared by the following general procedure. A low molecular weight polyamide is added to at least one conventional alkyd resin that may contain a solvent. This mixture is heated to between 120°–150° C. for at least one hour, and preferably for 2–6 hours. After cooling, the resulting thixotropic resin is a soft gel which, when used in paint manufacturing, imparts thixotropy to solvent based paint.

The alkyd resins that may be used to prepare the thixotropic resin of the present invention are generally alkyd resins made by the condensation polymerization of a dihydric or polyhydric alcohol and a polybasic acid or anhydride, and usually with a fatty acid modifier. Representative polyhydric alcohols include pentaerythritol, glycerol, propylene glycol, ethylene glycol, sorbitol, trimethylolethane, trimethylolpropane, dipentaerythritol, tripentaerythritol, neopentyl glycol, diethylene glycol, hexanetriol. Representative polybasic acids and anhydrides include phthalic anhydride, maleic anhydride, fumaric anhydride, adipic acid, azelaic acid, sebacic acid, tetrachlorophthalic anhydride, chlorendic anhydride, dimerized fatty acids, trimellitic anhydride and succinic anhydride. Representative fatty acids and oils include drying oils and semi drying oils such as soya oil, dehydrated castor oil, linseed oil, perilla oil, cottonseed oil, tall oil, safflower oil, fish oil and tung oil, and non-drying oils such as coconut oil, castor oil, palm oil and peanut oil, and the fatty acids derived from these oils. Preferably, the fatty acid modifier is derived from a drying oil.

More than one alkyd resin can be reacted at the same time with the polyamide to impart different properties to the resulting thixotropic alkyd. For example, alkyd resins having different oil lengths can be combined prior to reaction with the polyamide in various ratios depending on the desired hardness, solubility, weather resistance, gloss, brushing ease, and drying characteristics of the final coating. A long oil alkyd may be combined with a medium oil alkyd and a medium oil alkyd may be combined with a short oil alkyd. Customization of the thixotropic alkyd can be accomplished easily because there is no need to strip the solvents from the individual alkyd resins prior to reaction with the polyamide due to the low reaction temperatures used in the process of the present invention.

The low molecular weight polyamides useful in producing the thixotropic resins of the present invention include polyamides that are the reaction product of (a) a polycarboxylic acid; (b) an active hydrogen compound having the formula $X_m$—R—$Y_n$, wherein R represents a group containing from 2 to 12 carbon atoms, X and Y are independently selected from primary amino, secondary amino and hydroxy, and m and n are each at least 1 and the sum of (m+n) is at least 2; and (c) a capping agent comprised of an unsaturated and/or hydroxy functional monocarboxylic acid having from 8 to 22 carbon atoms. Such polyamides are described in U.S. Pat. No. 4,778,843 to Cooperman et al. and European Patent App. 92113829.3, which are incorporated herein by reference. Preferably, the polycarboxylic acid used to prepare the polyamide is an oligomer of fatty acids derived from soybean oil, castor oil, tall oil, corn oil, cottonseed oil, kapok seed oil, linseed oil and mixtures thereof. The active hydrogen compound is preferably a diamine having 2–12 carbon atoms and more preferably, the active hydrogen compound is 1,6-diamino hexane. The capping agent preferably comprises ricinoleic acid. A low molecular weight polyamide found to be particularly useful in preparing the thixotropic resin of the present invention is THIXATROL® TSR, commercially available from Rheox, Inc. THIXATROL® TSR is believed to be the reaction product of a polycarboxylic acid comprising a fatty acid dimer; 1,6-diamino hexane; and ricinoleic acid.

The amount of low molecular weight polyamide used in thixotropic resins of the present invention is that which will impart the desired thixotropic properties to the resin composition. While the amount used in each case is dependent upon the choice of alkyd resin or resins, organic solvent present and the degree of thixotropy desired, it is generally in the range of about 0.25% to 5% by weight, and preferably, about 0.7% to 4% by weight, based on the total solids weight of the thixotropic resin.

EXAMPLES A–E

The thixotropic resin is illustrated by the examples set forth in Table I. In these examples, Alkyd Resin I is a 50% solids resin in mineral spirits made by the condensation polymerization of 50.5% by weight of soybean oil, 11.3% by weight of pentaerythritol, 5.3% by weight of ethylene glycol and 32.8% by weight of phthalic anhydride. Alkyd Resin II is a 60% solids resin in aliphatic naphtha made by the condensation polymerization of 62.0% by weight soybean oil, 14.0% by weight pentaerythritol, 0.6% by weight maleic anhydride, and 23.4% by weight of phthalic anhydride.

Thixotropic resins A–E were produced by loading a reactor equipped with a mechanical stirrer and an inert gas source with the alkyd resin(s) and THIXATROL® TSR in the amounts indicated in Table I. Percentages given are weight % solids based on the total solids weight of the thixotropic resin. The reactants were mixed for approximately 30 minutes while the reactor was heated to the indicated temperature. After the predetermined temperature was reached, the reactor's contents were held at this temperature for the length of time indicated in Table I. The consistency of the resulting thixotropic resins is shown in Table I.

TABLE I

|  | Thixotropic Resins | | | | |
| --- | --- | --- | --- | --- | --- |
|  | A | B | C | D | E |
| Alkyd Resin I | 74.5% | 58.0% | 87.8% | — | 99.0% |
| Alkyd Resin II | 24.8% | 38.6% | 10.4% | 98.3% | — |
| Polyamide Resin[a] | 0.7% | 3.4% | 1.7% | 1.7% | 1.0% |
| Rxn. Temperature | 129° C. | 124° C. | 128° C. | 149° C. | 141° F. |
| Rxn. Time | 3 Hr. | 3 Hr. | 3 Hr. | 2 Hr. | 2 Hr. |
| Consistency | soft gel | gel | harder gel | soft gel | harder gel |

[a]Thixatrol TSR polyamide resin.

The thixotropic resins of the present invention may be used to impart thixotropic properties to paints and coatings, such as aromatic alkyd enamels and aliphatic alkyd paints. These paint and coating compositions generally contain a resinous binder, an organic solvent, pigments, extenders, fillers, thixotropic additives and the like. The resinous binder comprises the thixotropic resin of the present invention alone, or in combination with other thixotropic resins and non-thixotropic resins. Coating compositions produced with the thixotropic resins of the present invention exhibit superior leveling and sag resistance.

Conventional solvents such as xylene, benzene, toluene, naphtha and mineral spirits may be used in the coating composition of the present invention.

The coatings of the present invention may contain pigments and extenders as is well known in the art. Representative pigments include titanium dioxide, zinc oxide, antimony oxide, organic or inorganic chromatic pigments, iron oxide, carbon black, phthalocyanine blue, as well as metallic pigments such as aluminum. Representative extenders include calcium carbonate, clays, aluminum silicate, talc, magnesium silicate, silicas, calcium silicate, micas, barytes, gypsum, and diatomaceous earth.

The coatings may also contain other additives such as flow agents, catalysts, dispersing agents, metallic driers such as salts of cobalt, manganese, magnesium, cerium, chromium and zinc, and anti-skinning agents such as methyl ethyl ketoxime, acetaldehyde oxime, isobutylraldehyde oxime, and butyraldehyde oxime.

To further increase the thixotropy of the coating compositions of the present invention, thixotropic additives may be incorporated into the coating compositions along with the thixotropic resin. Such thixotropic additives are generally incorporated into the pigment dispersion or grind phase of the paint making process. Examples of conventional thixotropic additives include fumed silicas, organoclays such as bentonire clay and hectorire clay and castor oil derivatives such as THIXATROL® GST, THIXATROL® ST, and THIXATROL® R, commercially available from Rheox, Inc. Castor oil derivatives, however, may cause seeding in the coating composition upon storage. Preferably, the low molecular weight polyamide thixotropic additive THIXATROL® TSR is added to the coating composition during the pigment dispersion phase of the manufacturing process. The amount of thixotropic additive used in the coating compositions depends on the thixotropic properties of the resinous binder, the solvent, the thixotropic additive chosen and the degree of thixotropy desired. Generally, the amount of thixotropic additive THIXATROL® TSR incorporated into the coating composition is about 0 to 1% by weight, and preferably, about 0.3% to 0.6% by weight based on the total solids weight of the coating composition.

EXAMPLES 1 AND 2

Paint formulations utilizing the novel thixotropic resins of the present invention are illustrated by the following examples. These paint compositions were produced according to conventional paint manufacturing techniques. In the grinding or milling stage, high shear forces are applied to the pigment particles to diperse the particles in the resin. The heat generated in this stage causes an increase in temperature of the millbase, generally in the range of about 38°–70° C.

The rheological properties of the paint compositions of Examples 1 and 2, as well as those of Examples 3–13 are shown in Table II.

| Component | Example 1 Parts by Weight | Example 2 Parts by Weight |
| --- | --- | --- |
| Thixotropic Resin B | 40.55 | — |
| Thixotropic Resin C | — | 42.83 |
| Mineral Spirits | 22.12 | 19.88 |

-continued

| Component | Example 1 Parts by Weight | Example 2 Parts by Weight |
|---|---|---|
| Ca Drier | 1.27 | 1.27 |
| Lecithin Soya | 0.29 | 0.29 |
| TiO$_2$ Rutile | 29.25 | 29.46 |
| Atomite CaCO$_3$ | 3.71 | 3.71 |
| ASP 400 Clay | 2.43 | 2.24 |
| 12% Co Catalyst | 0.01 | 0.01 |
| Methylethyl Ketoxime | 0.29 | 0.29 |
| Pigments | 0.07 | 0.01 |

EXAMPLES 3–5

Thixotropic additives may be incorporated into paint compositions which utilize the thixotropic resins of the present invention as illustrated by Example 3. Comparative Examples 4 and 5 are paint compositions which do not contain a thixotropic resin, but which are formulated using only a thixotropic additive.

| Component | Example 3 Parts by Weight | Example 4 Parts by Weight | Example 5 Parts by Weight |
|---|---|---|---|
| Thixotropic Resin A | 43.57 | — | — |
| Alkyd Resin I | — | 34.04 | 32.71 |
| Alkyd Resin II | — | 9.48 | 7.31 |
| Aliphatic Naphtha | 16.43 | 16.40 | 16.4 |
| Thixatrol TSR | 0.64 | 0.77 | 1.41 |
| Lecithin Soya | 0.30 | 0.30 | 0.32 |
| Ca Drier | 2.54 | 2.53 | 2.71 |
| TiO$_2$ Rutile | 29.68 | 29.64 | 31.73 |
| Atomite CaCO$_3$ | 4.05 | 4.05 | 4.34 |
| Micronized Talc | 2.47 | 2.47 | 2.64 |
| 12% Co Catalyst | 0.01 | 0.01 | 0.01 |
| Methylethyl Ketoxime | 0.30 | 0.30 | 0.32 |

EXAMPLES 6 AND 7

Comparative Example 7 is a paint composition wherein the low molecular weight polyamide resin is heated to reaction temperature alone (129° C.) for three hours, cooled, and then combined with the same alkyd resins used to produce Thixotropic Resin A. When compared to Example 6 which contains Thixotropic Resin A, Example 7 appears to indicate that the thixotropy of the thixotropic resins of the present invention most likely is the result of a reaction between the polyamide resin and the alkyd resin, rather than crosslinking of the polyamide resin (See Table II).

| Component | Example 6 Parts by Weight | Example 7 Parts by Weight |
|---|---|---|
| Thixotropic Resin A | 48.99 | — |
| Alkyd Resin I | — | 36.01 |
| Alkyd Resin II | — | 10.01 |
| Heated Thixatrol TSR* | — | 0.46 |
| Aliphatic Naphtha | 10.50 | 13.04 |
| Lecithin Soya | 0.29 | 0.29 |
| Ca Drier | 2.51 | 2.50 |
| TiO$_2$ Rutile | 29.30 | 29.28 |
| Atomite CaCO$_3$ | 4.69 | 4.69 |
| Thixatrol TSR | 0.98 | 0.98 |
| Micronized Talc | 2.44 | 2.44 |
| 12% Co Catalyst | 0.01 | 0.01 |
| Methylethyl Ketoxime | 0.30 | 0.30 |

EXAMPLES 8–12

Examples 8 and 9 and Examples 10 and 11 are further examples of paint compositions which incorporate the thixotropic resin of the present invention and an additive thixotrope to enhance the thixotropy of the paint. The paint composition of Example 9 comprises a mixture of additive thixotropes.

| Component | Example 8 Parts by Weight | Example 9 Parts by Weight |
|---|---|---|
| Thixotropic Resin A | 49.19 | 51.69 |
| Aliphatic Naphtha | 10.80 | 11.39 |
| Bentone Clay | — | 0.35 |
| Anti Terra Byk | — | 0.20 |
| Lecithin Soya | 0.29 | 0.30 |
| Ca Drier | 3.32 | 2.56 |
| TiO$_2$ Rutile | 31.24 | 21.79 |
| Atomite CaCO$_3$ | 1.76 | 6.08 |
| Micronized Talc | 2.15 | 4.56 |
| Thixatrol TSR | 0.88 | 0.71 |
| 12% Co Catalyst | 0.02 | 0.02 |
| Methylethyl Ketoxime | 0.30 | 0.31 |
| Pigments | 0.05 | 0.02 |

Examples 10 and 11 are paint formulations of the present invention which incorporate different amounts of thixotropic additive. Comparative Example 12 is a paint formulation in which the alkyd resin used is not thixotropic. Instead, the thixotropic additive THIXATROL® TSR is used alone to impart thixotropy to the paint. The performance characteristics of these paints are shown in Table II.

| Component | Example 10 Parts by Weight | Example 11 Parts by Weight | Example 12 Parts by Weight |
|---|---|---|---|
| Thixotropic Resin D | 43.70 | 43.66 | — |
| Alkyd Resin I | — | — | 43.67 |
| Mineral Spirits | 18.51 | 17.52 | 18.01 |
| Lecithin Soya | 0.29 | 0.34 | 0.28 |
| Ca Drier | 1.27 | 1.27 | 1.27 |
| TiO$_2$ Rutile | 29.26 | 29.24 | 29.34 |
| Atomite CaCO$_3$ | 3.71 | 3.70 | 3.70 |
| ASP 400P Clay | 2.44 | 2.49 | 2.43 |
| 12% Co Catalyst | 0.01 | 0.01 | 0.01 |
| Methylethyl Ketoxime | 0.29 | 0.29 | 0.29 |
| Pigment | 0.01 | 0.01 | 0.01 |
| Thixatrol TSR | 0.51 | 1.46 | 0.97 |

EXAMPLE 13

The thixotropic resins of the present invention may be used with other thixotropic resins in formulating paints as illustrated by Example 13. In this example, Thixotropic Resin B is mixed with Burnok 3840, a medium oil thixotropic alkyd available from Synray Corporation.

| Component | Example 13 Parts by Weight |
|---|---|
| Thixotropic Resin B | 38.53 |
| Burnok Thixotropic Resin | 2.73 |
| Mineral Spirits | 21.43 |
| Lecithin Soya | 0.29 |
| Ca Drier | 1.27 |
| TiO$_2$ Rutile | 29.26 |
| Atomite CaCO$_3$ | 3.71 |
| ASP 400P Clay | 2.44 |
| 12% Co Catalyst | 0.01 |

-continued

| Component | Example 13 Parts by Weight |
|---|---|
| Methylethyl Ketoxime | 0.29 |
| Pigments | 0.05 |

EXAMPLE 14

General paint formulas using the thixotropic resin of this invention are illustrated by Example 14.

| Component | Example 14 Parts By Weight |
|---|---|
| Thixotropic Resin | 20 to 60 |
| Organic Solvent | 5 to 20 |
| Pigment | 15 to 40 |
| Fillers | 0 to 30 |
| Extenders | 0 to 5 |
| Driers | 0.01 to 10 |
| Catalyst | 0.01 to 1.0 |
| Thixotropic Additive | 0 to 2.0 |

TABLE II

| Example | Pre-Shear[a] Viscosity | Post-Shear[b] Viscosity | Difference[c] in Viscosity | Sag[d] Resistance | Leveling[e] |
|---|---|---|---|---|---|
| 1 | 339.0 | 34.5 | 304.5 | 18+ | 4 |
| 2 | 602.1 | 219.7 | 382.3 | 18+ | 4 |
| 3 | 226.3 | 56.8 | 169.5 | 18+ | 3 |
| Comp. 4 | 38.3 | 12.0 | 26.3 | 8 | 6 |
| Comp. 5 | 652.5 | 88.8 | 563.7 | 18+ | 1 |
| 6 | 448.9 | 145.6 | 303.3 | 18+ | 4 |
| Comp. 7 | 189.6 | 58.2 | 131.4 | 16 | 2 |
| 8 | 188.6 | 25.5 | 163.1 | 18+ | 4 |
| 9 | 190.0 | 17.6 | 172.4 | 18+ | 4 |
| 10 | 101.7 | 10.3 | 370.0 | 18 | 5 |
| 11 | 574.2 | 75.0 | 499.2 | 18+ | 4 |
| Comp. 12 | 47.8 | 13.9 | 33.9 | 8 | 6 |
| 13 | 403.7 | 30.1 | 373.6 | 18+ | 2 |

[a]Poise, at 20° C. shear rate 1 sec$^{-1}$
[b]Same as in a, after an up (1 min.) and down (1 min.) ramp of sustained shear up to shear stress of 300 dyne/cm$^{-2}$
[c](pre-shear viscosity) − (post-shear viscosity)
[d]Leneta Sag Resistance Test: higher value means better sag resistance.
[e]Leslie Bar Leveling Test: higher value means better leveling.

The coatings prepared from the thixotropic resins of the present invention may be applied to various substrates including metal surfaces by conventional techniques, such as brushing, roller coating, spraying and the like. Moreover, the paint formulas may be applied to either treated or untreated surfaces which are then allowed to dry at ambient or room temperature.

While this invention has been described with respect to a number of specific embodiments, it is obvious that there are other variations and modifications which can be made without departing from the spirit and scope of the invention as more particularly set forth in the following claims.

The invention claimed is:

1. A process of preparing a thixotropic resin which comprises heating to a temperature of between about 120° and 150° C. for at least one hour (a) at least one alkyd resin and (b) a polyamide comprising the reaction product of:
   (i) a polycarboxylic acid:
   (ii) an active hydrogen compound having the formula $X_m$—R—$Y_n$, wherein R represents a group containing from 6 to 12 carbon atoms, X and Y are independently selected from primary amino, secondary amino, and hydroxy, and m+n are each at least 1 and the sum of (m+n) is at least 2 with the proviso that at least 90% of the X and Y groups participating in the reaction are selected from primary amino, secondary amino or a mixture thereof; and
   (iii) a capping agent comprised of monocarboxylic acid having from 8 to 22 carbon atoms and which is selected from the group consisting of unsaturated monocarboxylic acid, hydroxylated monocarboxylic acid and unsaturated hydroxylated monocarboxylic acid.

2. The process of claim 1 wherein the polycarboxylic acid is an oligomer prepared from a fatty acid derived from an oil selected from the group consisting of soybean oil, castor oil, tall oil, corn oil, cottonseed oil, kapok seed oil, linseed oil and mixtures thereof.

3. The process of claim 1 wherein the active hydrogen compound comprises a diamine having from 6–12 carbon atoms.

4. The process of claim 3 wherein the diamine is 1,6-diaminohexane.

5. The process of claim 1 wherein the monocarboxylic acid capping agent is ricinoleic acid.

6. The process of claim 1 wherein the alkyd resin contains an organic solvent.

7. The process of claim 1 wherein said mixture is heated for about 2 to 6 hours.

8. The process of claim 1 wherein said alkyd resin is the reaction product of pentaerythritol, phthalic anhydride and fatty acid derived from soya oil.

9. A thixotropic resin comprising the reaction product of (a) at least one alkyd resin and (b) a polyamide comprising the reaction product of:
   (i) a polycarboxylic acid:
   (ii) an active hydrogen compound having the formula $X_m$—R—$Y_n$, wherein R represents a group containing from 6 to 12 carbon atoms, X and Y are independently selected from primary amino, secondary amino, and hydroxy, and m+n are each at least 1 and the sum of (m+n) is at least 2 with the proviso that at least 90% of the X and Y groups participating in the reaction are selected from primary amino, secondary amino or a mixture thereof; and
   (iii) a capping agent comprised of monocarboxylic acid having from 8 to 22 carbon atoms and which is selected from the group consisting of unsaturated monocarboxylic acid, hydroxylated monocarboxylic acid and unsaturated hydroxylated monocarboxylic acid.

10. The thixotropic resin of claim 9 wherein the polycarboxylic acid is an oligomer prepared from a fatty acid derived from an oil selected from the group consisting of soybean oil, castor oil, tall oil, corn oil, cottonseed oil, kapok seed oil, linseed oil and mixtures thereof.

11. The thixotropic resin of claim 9 wherein the active hydrogen compound comprises a diamine having from 6–12 carbon atoms.

12. The thixotropic resin of claim 11 wherein the diamine is 1,6-diaminohexane.

13. The thixotropic resin of claim 9 wherein the monocarboxylic acid capping agent is ricinoleic acid.

14. The thixotropic resin of claim 9 wherein said alkyd resin is the reaction product of pentaerythritol, phthalic anhydride and fatty acid derived from soya oil.

15. A thixotropic organic solvent-based composition comprising a thixotropic resin comprising the reaction product of (a) at least one alkyd resin and (b) a polyamide comprising the reaction product of:

(i) a polycarboxylic acid:

(ii) an active hydrogen compound having the formula $X_m$—R—$Y_n$, wherein R represents a group containing from 6 to 12 carbon atoms, X and Y are independently selected from primary amino, secondary amino, and hydroxy, and m+n are each at least 1 and the sum of (m+n) is at least 2 with the proviso that at least 90% of the X and Y groups participating in the reaction are selected from primary amino, secondary amino or a mixture thereof; and (iii) a capping agent comprised of monocarboxylic acid having from 8 to 22 carbon atoms and which is selected from the group consisting of unsaturated monocarboxylic acid, hydroxylated monocarboxylic acid and unsaturated hydroxylated monocarboxylic acid.

16. The thixotropic organic solvent-based composition of claim 15 wherein the polycarboxylic acid is an oligomer prepared from a fatty acid derived from an oil selected from the group consisting of soybean oil, castor oil, tall oil, corn oil, cottonseed oil, kapok seed oil, linseed oil and mixtures thereof.

17. The thixotropic organic solvent-based composition of claim 15 wherein the active hydrogen compound comprises a diamine having from 6–12 carbon atoms.

18. The thixotropic organic solvent-based composition of claim 17 wherein the diamine is 1,6-diaminohexane.

19. The thixotropic organic solvent-based composition of claim 15 wherein the monocarboxylic acid capping agent is ricinoleic acid.

20. The thixotropic organic solvent-based composition of claim 15 wherein said alkyd resin is the reaction product of pentaerythritol, phthalic anhydride and fatty acid derived from soya oil.

21. The thixotropic organic solvent-based composition of claim 15 further comprising at least one thixotropic additive.

22. The thixotropic organic solvent-based composition of claim 21 wherein said thixotropic additive is selected from the group consisting of fumed silica, organoclays, castor oil derivatives, polyamide resins and mixtures thereof.

23. The thixotropic organic solvent-based composition of claim 21 wherein said thixotropic additive comprises a polyamide comprising the reaction product of:

(i) a polycarboxylic acid:

(ii) an active hydrogen compound having the formula $X_m$—R—$Y_n$, wherein R represents a group containing from 6 to 12 carbon atoms, X and Y are independently selected from primary amino, secondary amino, and hydroxy, and m+n are each at least 1 and the sum of (m+n) is at least 2 with the proviso that at least 90% of the X and Y groups participating in the reaction are selected from primary amino, secondary amino or a mixture thereof; and (iii) a capping agent comprised of monocarboxylic acid having from 8 to 22 carbon atoms and which is selected from the group consisting of unsaturated monocarboxylic acid, hydroxylated monocarboxylic acid and unsaturated hydroxylated monocarboxylic acid.

24. The thixotropic organic solvent-based composition of claim 15 further comprising a non-thixotropic alkyd resin.

25. The thixotropic organic solvent-based composition of claim 15 further comprising at least one pigment.

* * * * *